Jan. 1, 1924

E. R. WOLCOTT 1,479,270

METHOD FOR THE REMOVAL OF SUSPENDED MATERIAL FROM GASES

Filed March 14, 1919

Inventor:
Edson R. Wolcott.
By Arthur P. Knight.
Atty.

Patented Jan. 1, 1924.

1,479,270

UNITED STATES PATENT OFFICE.

EDSON R. WOLCOTT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD FOR THE REMOVAL OF SUSPENDED MATERIAL FROM GASES.

Application filed March 14, 1919. Serial No. 282,700.

*To all whom it may concern:*

Be it known that I, EDSON R. WOLCOTT, a citizen of the United States, residing at Los Angeles, in the county of Los Angeles and State of California, have invented a new and useful Method for the Removal of Suspended Material from Gases, of which the following is a specification.

This invention relates to the art of removing dust and fume from hot furnace gases and is particularly applicable in connection with the separation and removal of suspended material from gases passing from Portland cement kilns. It has been attempted to remove and recover such suspended material by the action of water sprays, and similar means, but while such sprays are effective to a certain extent they do not remove more than a certain proportion of the suspended material. The use of a wet collecting system has, however, the advantage in connection with the removal of dust and fume from cement kiln gases that it recovers in the form of solution certain soluble constituents of such dust and fume, particularly potassium salts, constituting a valuable by-product of the cement industry.

Electrical precipitation has also been used successfully in collecting suspended material from cement kiln gases and it has been found of advantage in certain cases to carry out the electrical precipitating operation in such manner that the suspended material is collected in the presence of sufficient water or solution to form a fluid in which the soluble constituents of the dust and fume eventually become dissolved. In such an operation the difficulty has arisen that scales or incrustations are liable to be formed on the collecting surfaces requiring frequent cleaning and interfering with the continuous operation of the process and the main objects of the present invention are to effect a higher concentration of potash in the precipitator, eliminate the incrustations formed therein, and in general increase the efficiency of operation.

Another object of the invention is to provide for securing effective operation of an electrical precipitator in collecting dust and fume in a liquid film while at the same time preventing the formation of scales or incrustations on or in the electrical precipitator.

Figure 1:
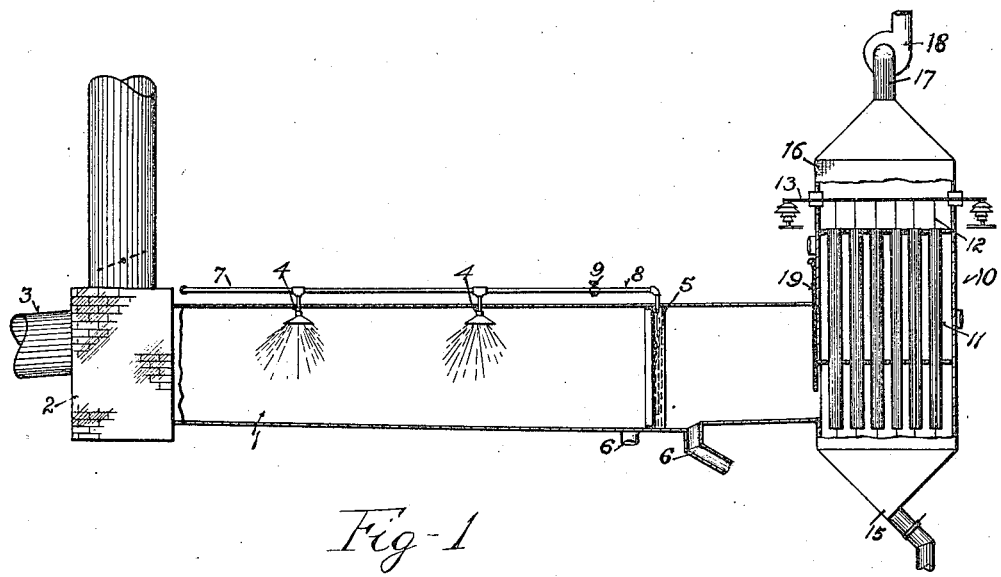

In the accompanying drawings, Fig. 1 is a longitudinal section of a dust and fume collecting apparatus for carrying out my invention.

Figure 2:
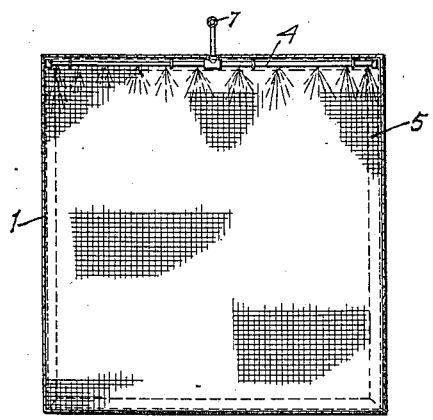

Fig. 2 is a transverse section on line 2—2 in Fig. 1 showing merely the body of the flue.

Referring to the drawings, the flue indicated at 1 is connected to receive the effluent gases from a cement kiln, being, for example, connected to the stack base 2 of a cement kiln 3, the stack base being provided with means for normally directing the entire or any desired proportion of the kiln gases into the flue 1, said flue is provided at various points along its length with water distributing means 4, which may be spray nozzles, or atomizers, operating either by pressure, or by rotary or other, mechanical means, in well known manner to spray and distribute water in finely divided condition throughout the body of gas passing through the flue, preferably in such manner as to saturate, or approximately saturate, the gases with water. At a part of the flue beyond the several water sprays 4 is provided a screen or filter 5 extending transversely in the flue so as to intercept the gases passing therethrough. This filter may be made of metallic screen in layers with staggered mesh, or of coke, or of asbestos, excelsior, or other suitable material. The bottom of the flue 1 is preferably inclined so as to drain the liquid to outlets 6. A water supply pipe 7 leads to the respective nozzles 4 and is preferably provided with a branch 8 having a valve 9 and discharging into or onto the filter or screen 5.

An electrical precipitator, indicated at 10, is connected to receive the gases from the flue 1 and is provided with suitable means, such as collecting electrodes 11, formed as vertical pipes and discharge electrodes 12, mounted on insulated frame 13 and extending within said pipes for maintaining an electrical field through which the gases are passed. The casing of the electrical precipitator is provided at its lower portion with suitable means, such as funnel 15, for drawing off collected material and at its upper portion with a header 16, communicating with an outlet stack 17. If necessary, suitable means, such as a fan or blower 18, may be provided for maintaining draft through the apparatus. The discharge electrodes 12 are connected to any suitable means, for example, as disclosed in patent to F. G. Cottrell—No. 895,729—August 11th, 1908, and the casing 14 is preferably grounded. A damper or gas flow restricting means 19 may be provided between filter means 5 and the electrical precipitator to cause expansion of the gas with resultant cooling and condensation of moisture in the form of fog or cloud, such condensation taking place largely on the solid suspended particles and on ions produced in the electrical precipitator, acting as nuclei. The precipitator 10 may be cooled by circulation of atmospheric air, or other cooling medium, around the electrodes 11.

It is to be understood that any other suitable form of electrical precipitator may be used instead of the form herein shown but it is preferred to use a form with vertically extending collecting electrodes to facilitate the flow of liquid collected material downwardly on same.

The process is carried out in the above described apparatus as follows:

The hot gases coming from the kiln pass through the flue 1 and are therein humidified to a condition of more or less complete saturation (preferably to approximate saturation) and the gases then pass through the filter or screen 5, wherein the heavier solid particles carried in suspension by the gases are filtered out thereby eliminating most of the solid particles of the raw mix carried out of the kiln by the hot gases and thus separating these heavy particles from the alkali particles which are actually volatilized. In this way most of the lime is separated from the potash, thereby increasing the potash concentration and eliminating the difficulties of incrustation, which are due largely to the presence of calcium salts in the solution. The filter or screen 5 is washed or flushed intermittently or continually with water or solution supplied by means 8 and thereby kept clean. In case an adherent deposit is formed on the filter and is not removable by washing, the filter may be removed. The gases pass from the filter or screen 5 to the electrical precipitator 10, wherein they are subjected to electrical action to precipitate suspended material therefrom.

An important effect of the water sprays and the subsequent passage of the gas through the filter is that the gases are thoroughly or substantially saturated with water vapor and in passing to and through the electrical precipitator are cooled (by conduction through the walls and by expansion at the damper 19, if desired) sufficiently to cause more or less condensation of water upon the walls or flues of the precipitator, either directly or by precipitation of condensed fog produced by such cooling of the saturated gases. By this means sufficient liquid may be caused to collect on the walls of the precipitator to form with the precipitated suspended material (dust or fume) a fluid deposit or film which runs down on the walls or collecting electrodes of the precipitator, whereby the precipitate is continually recovered from the electrodes and no especial cleaning means is required.

The liquid or sludge drawn off from the delivery means 15 may be suitably treated to remove the liquid from the solid portions thereof and part or all of the liquid so obtained may be returned to the spray devices through pipe 7 in any suitable manner so as to provide for accumulation or progressive concentration of the resulting solution; the same is true of the liquid or sludge drawn off at the outlets 6, which represents the excess of liquid supplied to the gases beyond that which is required for humidification or saturation, together with any solid material washed out of the gases by the spray means 4, or in the filter 5. The liquid obtained in the manner above described and also the solids separating therefrom may be treated in any suitable manner for recovery of solubles, or other valuable constituents thereof, after a suitable state of concentration has been reached and, in that case, a portion of such liquid may from time to time, or continually be withdrawn from the apparatus for such treatment, the remainder being returned to the spray devices, together with more or less fresh water. If desired, however, fresh water only may be introduced by the spray devices and the solution obtained from the outlet means 6 and 15 may be evaporated to dryness, or otherwise treated for recovery of solubles without returning any part of the liquid to the spray devices.

What I claim is:

1. The method of removing suspended material from gases, which consists in distributing water into such gases to humidify the same, then passing the gases through a wetted filtering medium to filter out part of the suspended matter and to further humidify the gases, and then subjecting the gases to the action of an electrical field to precipitate suspended material therefrom, the gases and the precipitated material being subjected to cooling action in such manner as to cause condensation of water from the water vapor present in the gases, and collection of such condensed water with the precipitated material.

2. A method, according to claim 1, wherein the gases are caused to expand after passing through the filtering medium to cause cooling and condensation of moisture in the form of fog, such fog being subsequently precipitated along with the suspended material by the action of the electrical field.

3. The method of removing from hot furnace gases suspended material, including lime and soluble salts, which consists in spraying water into the gases to saturate the same, then passing the gases through a filtering medium to remove suspended material, including some of the lime, from the gases, the above operations being carried out in such manner as to substantially saturate the gases with moisture, and then passing the gases through an electrical field to precipitate suspended material and reducing the temperature of the gases sufficiently to cause collection of water along with the suspended material in the precipitating action in said electrical field.

In testimony whereof I have hereunto subscribed my name this 5th day of March, 1919.

EDSON R. WOLCOTT.